Oct. 16, 1962 B. W. GABRIELSEN ETAL 3,058,743
SPRINGBOARD
Filed Nov. 25, 1960 4 Sheets-Sheet 1

INVENTORS
JAMES E. DYE
BRAMWELL W. GABRIELSEN
BY Cushman, Darby & Cushman
ATTORNEYS Oct. 16, 1962  B. W. GABRIELSEN ETAL  3,058,743
SPRINGBOARD
Filed Nov. 25, 1960  4 Sheets-Sheet 2
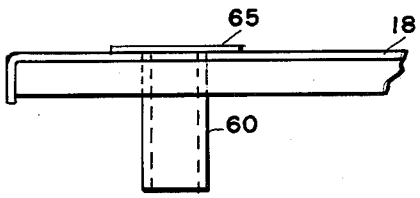
FIG.7.
FIG.5.
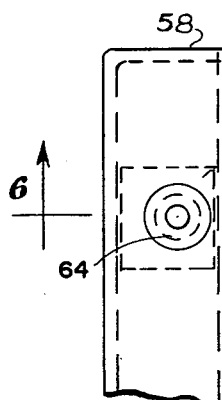
FIG.6.
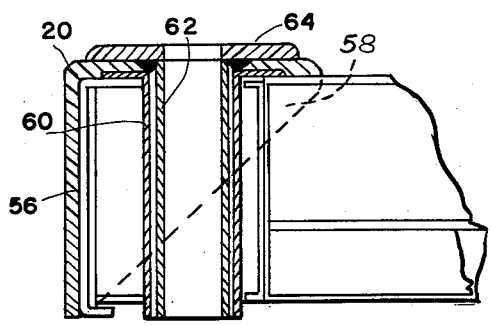
FIG.8.
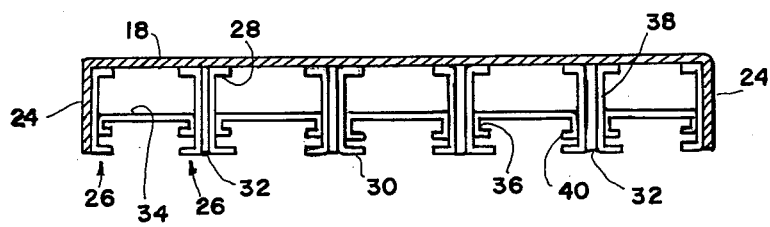
FIG.9.
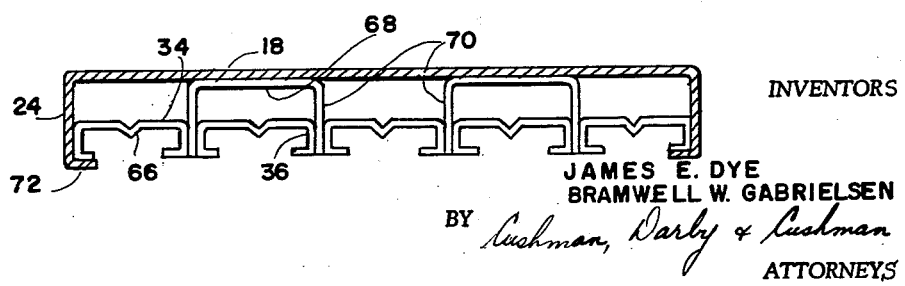
INVENTORS
JAMES E. DYE
BRAMWELL W. GABRIELSEN
BY Cushman, Darby & Cushman
ATTORNEYS

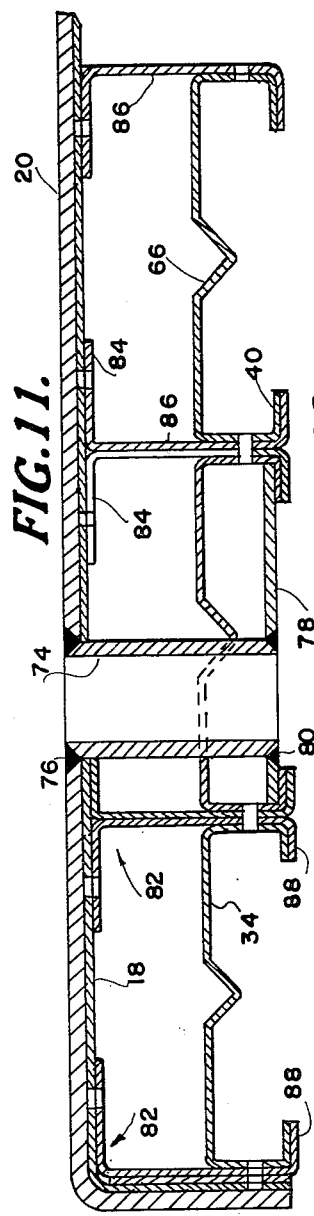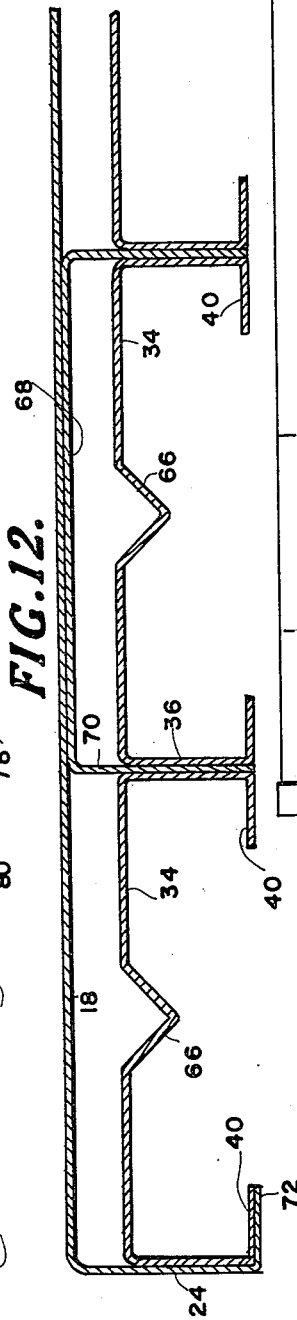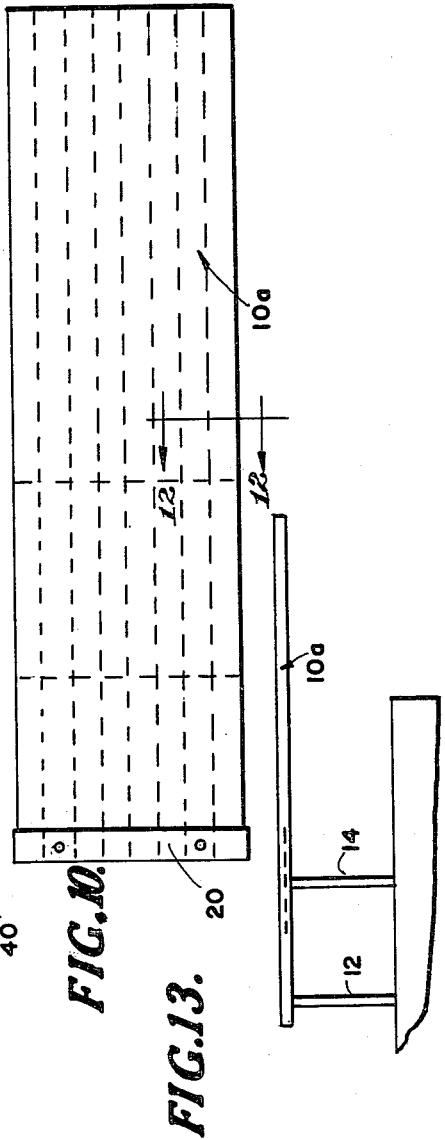
INVENTORS
JAMES E. DYE
BRAMWELL W. GABRIELSEN
BY Cushman, Darby & Cushman
ATTORNEYS

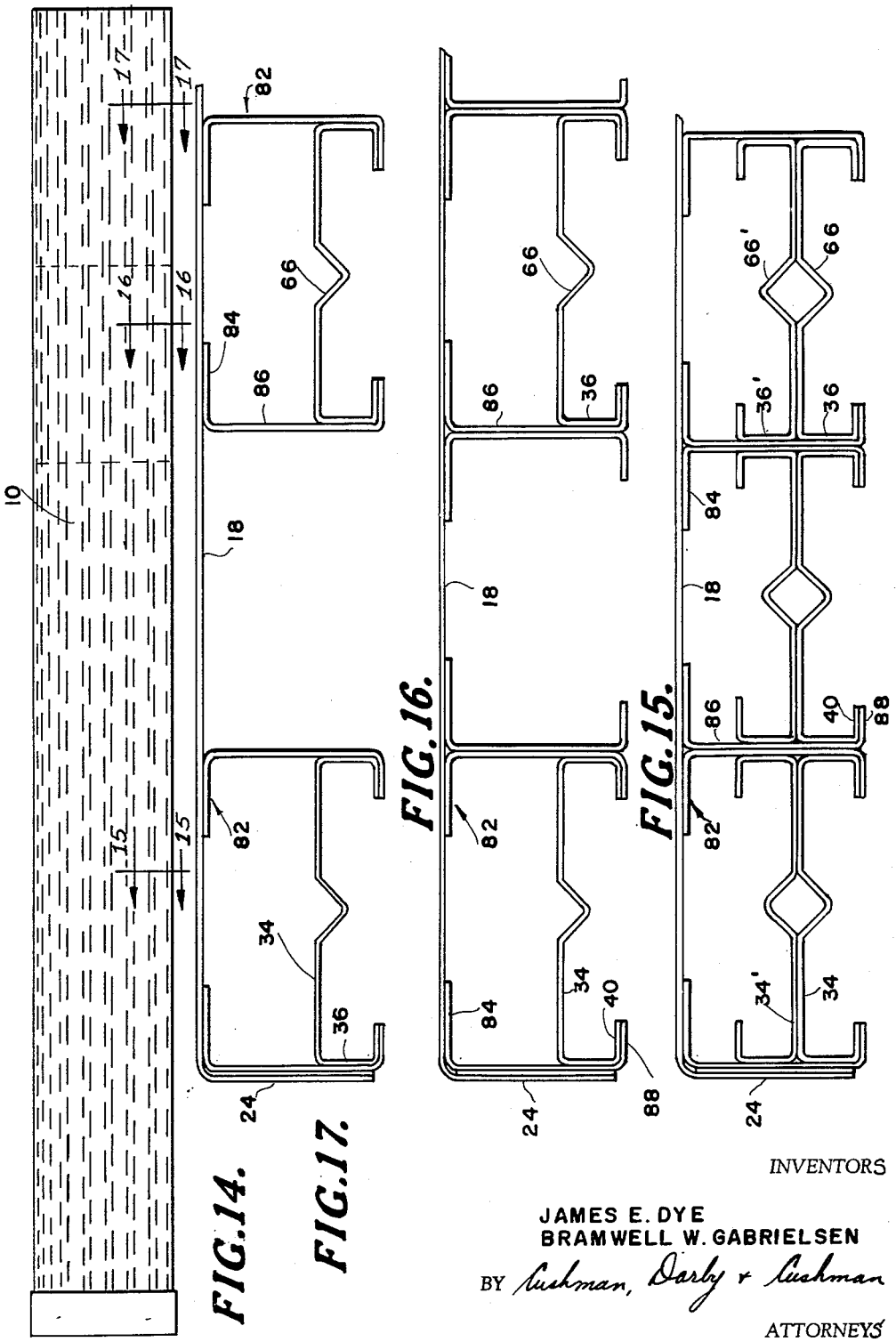

United States Patent Office 3,058,743
Patented Oct. 16, 1962

3,058,743
SPRINGBOARD
Bramwell W. Gabrielsen, 290 King Ave., and James E. Dye, 2092 Jefferson Road, both of Athens, Ga.
Filed Nov. 25, 1960, Ser. No. 71,633
12 Claims. (Cl. 272—66)

This invention relates to an improved springboard of the type used in competitive diving events in organized competition, for recreation purposes and the like, and is a continuation-in-part of our copending application, Serial No. 844,593, filed October 5, 1959, now abandoned.

Springboards for organized diving competition as well as for recreational use are well-known in the art. The prior art springboard developments have provided constructions ranging from one-piece wood plankings, laminated wood structures, fiber glass-covered wood springboards, to various recent developments wherein diverse designs of metal springboards have been provided. Some of the more recent developments in this art have utilized extrusions as well as lamination techniques in their construction. Additionally, the materials utilized in such structures have ranged from, of course, wood, to aluminum as well as other materials.

While the prior art springboard devices have enjoyed varying degrees of success from the standpoint of ability to retain their spring-like action over extended periods of time, the prior art springboards do not afford optimum results. It is, accordingly, an object of this invention to provide a new and improved springboard for diving embodying novel structural features.

Another object of this invention is to provide a springboard which preferably utilizes stainless steel construction throughout and is characterized by enhanced spring action and high qualities of durability over long periods of time.

Another object of this invention is to provide a springboard device which is acceptable for all types of competitive diving events, gymnasium springboards, springboards used for recreational purposes at private homes, motels, clubs, and the like, which is characterized by new and improved rib structures particularly adapted for springboards of different lengths.

Further objects and advantages of this invention will become apparent in the following specification, claims, and accompanying drawings, wherein:

FIGURE 5 is a partial plan view of the inboard portion of the springboard, showing an alternate means for securing the springboard to the securing means;

FIGURE 6 is a view taken along line 6—6 of FIGURE 5;

FIGURE 7 is a partial elevation view of a spacer element used in FIGURE 6;

Figure 2:
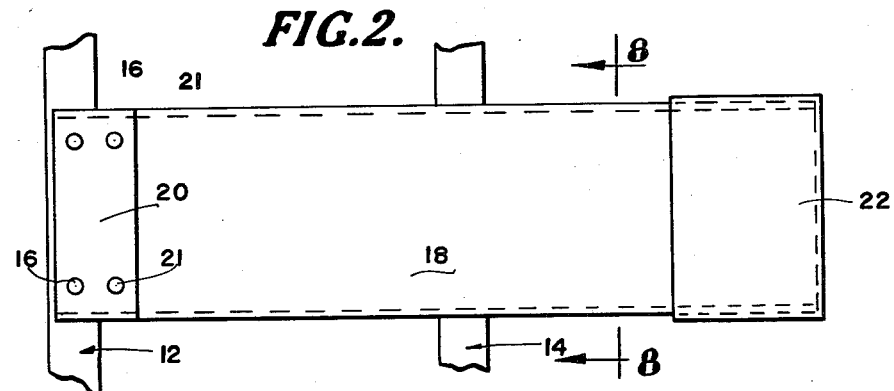
FIGURE 2 is a plan view of the springboard in FIGURE 1.

FIGURE 8 is a view taken along line 8—8 of FIGURE 2, this structure being preferably adapted for 14 ft. and 16 ft. springboards; and FIGURE 9 is a modification of the structure shown in FIGURE 8, this structure being preferably adapted for 6 ft.–12 ft. springboards;

FIGURE 10 is a plan view of a 6 ft–12 ft. springboard construction according to another embodiment of this invention;

FIGURE 11 is a cross-sectional elevation view taken on the inboard end of a springboard, this structure being adapted for 14 ft. and 16 ft. springboards;

FIGURE 12 is an elevation section view taken along line 12—12 of FIGURE 10;

FIGURE 13 is a side elevation view of the springboard in FIGURE 10;

FIGURE 14 is a plan view of a 16 ft. springboard according to another embodiment of this invention;

FIGURE 15 is an elevation section view taken along lines 15—15 of FIGURE 14;

FIGURE 16 is an elevation section view taken along line 16—16 of FIGURE 14; and

FIGURE 17 is an elevation section view taken along line 17—17 of FIGURE 14.

Figure 1:
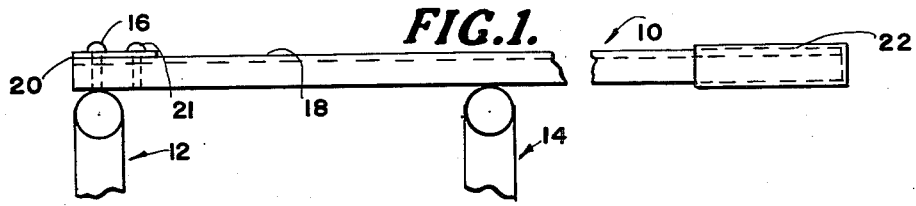
FIGURE 1 is a side elevation view of one embodiment of the springboard according to this invention.

Reference is now made to the drawings, and specifically FIGURES 1 through 8. There is shown in FIGURES 1 and 2 a springboard 10 which is fixedly secured to a rear supporting member 12 and is freely supported by a forward supporting member 14. As will be evident, the inboard end of the spring board 10 is fastened to the rear supporting member 12 by a bolt 16. The rear and forward supporting members 12 and 14 respectively are of conventional structure and form no part of this invention, the supporting members 12 and 14 being secured by appropriate means (not shown) to the edge of a swimming pool.

The springboard 10 includes a top plate 18 which extends the length of the springboard 10 from the inboard end to the outboard end, as will be understood. On the inboard end of the springboard 10 is disposed a mounting plate 20 which provides enhanced structural strength in the area where the bolts 16 pass through the springboard 10. Bolts 21 also join the mounting plate 20 to the springboard 10. On the outboard end of the springboard 10 is disposed a protective safety cover 22 of, for example, synthetic rubber or the like, the safety cover 22 protecting the diver from inadvertent injury on the edge of the springboard 10. The top plate 18 of the springboard 10 may be covered with suitable nonskid composition paint, nonskid treads, or the like, as are well-known in the art.

Figure 3:
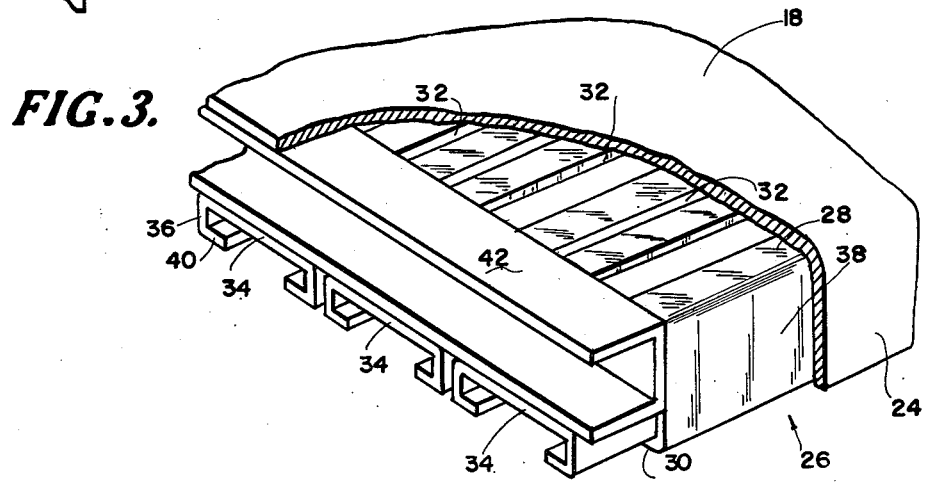
FIGURE 3 is a perspective view, partly in section, of the free end portion of the springboard in FIGURES 1 and 2.
Figure 4:
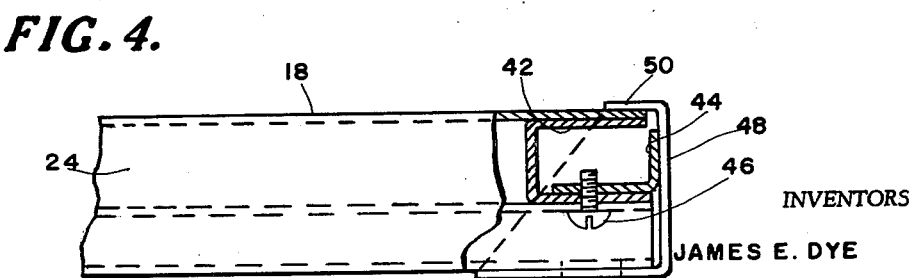
FIGURE 4 is a partial side elevation view, partly in section, of the springboard in FIGURES 1 to 3.

Referring now to FIGURES 3, 4 and 8, the structure of the springboard 10 according to one embodiment of this invention is shown, this structure being particularly suited for springboards in the order of 14 and 16 ft. in length. The top plate 18 has depending side walls 24 which extend the length of the springboard 10. A plurality of vertically disposed channel members 26 having upper and lower flanges 28 and 30 respectively, extend longitudinally below the top plate 18. In this regard, the upper flanges 28 are secured to the underside of the top plate 18 by suitable means, as by resistance or plug welding. Channel members 26 are disposed in a back-to-back relationship, there being a vertical plate disposed between adjacent channel members, as best shown in FIGURE 8. The vertical plates 32 are disposed on the underside of the top plate 18. In this regard, the vertical plates 32 may be of progressively decreasing height from the inboard end to the outboard end of the springboard 10. Thus, the strength of the springboard 10 will be progressively decreased towards the outboard end, providing a whip-like effect when the springboard 10 is used. The vertical plates 32 may be a plurality of aligned plates, each having a progressively decreasing vertical height. Mounted between adjacent channel members 26 are bottom plate members 34 having flanges 36 extending therefrom which are secured to the vertical walls 38 of channel members 26. The bottom plate members 34 may have inwardly extending lips 40, as shown in FIGURE 8.

Referring specifically to FIGURE 3, there is shown a partial perspective view of the end structure of the springboard 10 according to a feature of this invention. The structure shown in FIGURE 3 is equally well adapted for both the inboard and outboard ends of the springboard 10, the safety cover 22 or the mounting plate 20 being omitted for clarity. The channel members 26 and the vertical plates 32 are terminated slightly before the end of the springboard 10, the bottom plate members 34 extending to the end of the springboard 10. There is disposed a transverse channel 42 across the top of the bottom plate members 34, which is also in abutment with the top plate 18, as best shown in FIGURE 3.

In FIGURE 4, there is shown the complete outboard end structure, also with the safety cover 22 omitted for clarity, the structure is substantially identical to that in FIGURE 3, additionally with a transversely extending L member 44 secured to the transverse channel 42 and the bottom plate members 34, as by machine screws 46. Slidably disposed on the outboard end of the springboard 10 is a cap member 48 having upper and lower flanges 50 and 52, respectively. The upper flange 50 abuts top plate 18, while the lower flange 52 abuts the lips 40 of the bottom plate members 34.

Reference is now made to FIGURES 5, 6 and 7, which show the inboard end structure of the springboard 10 for engagement with the rear supporting member 12. As previously mentioned, a plate 20 extends transversely across the inboard end of the springboard 10. The mounting plate 20 includes a depending end wall 56, and depending side walls 58 (FIGURE 7). A first spacer member 60 passes vertically through the springboard 10, and a second spacer member 62 is disposed concentrically within the first spacer 60. The second spacer member has a flange 64 on its upper end which abuts the mounting plate 20. The first spacer member may have a plate 65 which abuts the top plate 18, and the underside of the mounting plate 20, as best shown in FIGURE 6.

Referring now to FIGURES 9, 10, 12 and 13, there is shown an alternate springboard structure 10a, which is particularly adapted for springboards in the order of 6 ft. through 12 ft. in length. In FIGURES 9 and 12, the bottom plate members 34 have longitudinally recessed portions 66. Secured to the underside of the top plate 18 are a plurality of downwardly facing channel members 68, having depending walls 70. The flanges 36 of the bottom plate members 34 are secured by suitable means to the inner and outer sides of the depending walls 70. In this regard, the members 68 are alternatively spaced apart, whereby one bottom plate member 34 is disposed wholly within the member 68, while the next adjacent bottom plate member 34 is wholly without the member 68. Additionally, the top plate 18 may have inwardly extending lips 72 which abut the bottom side of the lips 40 of the bottom plate members 34.

It will be noted that FIGURES 8 and 9 show the bottom plate members 34 disposed adjacent to the lower end of the channel members 26 and 68 respectively, this arrangement providing a highly effective whip-like effect of the springboard 10a. FIGURES 8 and 9 show a 5-channel springboard; however, 7 and 9-channel springboard construction has been found to be equally well suited for this purpose. The inboard end portion of the springboard 10a is adapted to receive the bolts 16 for securing the springboard 10a to the rear supporting member 12, in the manner that the springboard 10 is secured in FIGURES 5, 6, 7, and 11.

Referring now to FIGURE 12, the strength of the springboard 10a is decreased to provide a generally whip-like action or springing effect. The structure in FIGURE 12 is generally similar to the structure in FIGURE 9, wherein the bottom plate members 34 are joined at their respective vertical flanges 36 to the member 68. At the sides of the springboard 10a the flange portion 36 is joined to the depending side wall 24 of the top plate 18, as shown in FIGURE 12.

FIGURE 11 shows the cover plate 18, and the mounting plate 20, with cylindrical spacer members 74 passing vertically therethrough, and secured to the top plate 20 by weld 76. An aligning plate 78, secured to the bottom portion of the springboard 10a provides additional support for the spacer members 74, to which it is appropriately secured, as by weld 80.

Referring now to FIGURES 11, and 14 through 17, still another embodiment of the springboard 10 is shown, which is particularly adapted for a 14 and 16 ft. springboard used in organized diving competition, wherein the structural strength of the springboard is progressively decreased from the inboard end to the outboard end. The maximum structural strength is provided, as shown in FIGURE 15, the strength decreasing in FIGURES 16 and 17 respectively.

The mounting plate 20 is preferably secured as shown in FIGURE 11, and the end structure is generally similar to the structure shown in FIGURES 3 and 4. In FIGURE 11, there are shown longitudinally extending inverted L members 82 having horizontal leg portions 84 which are secured to the underside of the top plate 18, as by welding. The vertical walls 86 of the L members 82 are joined together in a back-to-back relationship by suitable means. Passing longitudinally between adjacent L members 82 are a plurality of bottom plate members 34 having recessed portions 66 therealong. The L members have a flange 88 which is in abutment with the lips 40 of the bottom plate members 34. This structure is, of course, repeated along the transverse width of the springboard 10.

Referring now to FIGURE 15, the top plate 18 is shown with downwardly extending side walls 24. A plurality of inverted L members 82 are arranged in back-to-back relationship, generally as shown also in FIGURE 11. The main distinction between the structure in FIGURE 11 and the structure in FIGURE 15 is the addition of complementary bottom plate members 34', which are the same in structure as bottom plate members 34. The complementary members 34' are disposed in a back-to-back relationship with the bottom plate members 34 to provide enhanced rigidity of the springboard 10 at the inboard end.

In FIGURE 16, the strength of the springboard 10 is decreased by terminating the bottom plate members 34 and the complementary members 34' in alternate rows. Additionally, the complementary members 34' are terminated across the transverse length of the structure, thereby leaving the L members 82 and bottom plate members 34 in alternate rows, as shown in FIGURE 16.

In FIGURE 17, the L members are no longer arranged in a back-to-back relationship, the alternate pairs of L members being terminated. Thus, as shown in FIGURE 17, there are provided facing L members 82 with bottom plate members 34 being joined with their flanges 36 to the respective vertical walls 86. This arrangement is provided for alternate rows, as shown in FIGURE 17.

While numerous embodiments of the invention are shown, it will be appreciated that the novel structural features included herein may be used interchangeably in the various embodiments of this invention.

Preferably, stainless steel construction is used in the embodiments of this invention, stainless steel having been found to be highly durable and efficient for the purposes required.

The various structures disclosed herein provide for a springboard which has substantial resilience, wherein the normal stresses exerted on the springboard are insufficient to cause permanent deformation by exceeding the elastic limit of the varoius elements.

It will, therefore, be seen that there has been provided by this invention a structure in which the various objects

We claim:

1. A springboard device comprising: an elongated top portion, said top portion including depending side walls extending substantially the entire length thereof; vertical members disposed in transversely spaced relation between said side walls and extending downwardly from and longitudinally of said top portion, said vertical members being secured to the lower surface of said top portion; bottom plate members including horizontally disposed portions extending longitudinally of said top portion and across spaces between said vertical members, said horizontal portions being disposed intermediate said top portion and the lower edges of said vertical members, said bottom plate members being secured to the adjacent side walls of said vertical members whereby there are formed substantially throughout the length of the springboard a plurality of substantially rectangular spaces defined by the horizontal portions of the bottom plate members, the vertical members, and the top portion.

2. Structure defined in claim 1, said bottom plate members including depending flanges which are secured to the adjacent side walls of said vertical members.

3. Structure defined in claim 1 wherein said vertical members include laterally extending flanges at their upper edges, said flanges being secured to the underside of said top portion.

4. Structure defined in claim 1, wherein each of said vertical members is in the form of a channel, said vertical members being disposed in back-to-back relation.

5. Structure defined in claim 1, wherein said vertical members include flanges at their upper ends and inwardly directed flanges at their lower ends, said bottom plate members including depending flange portions and lips extending inwardly of said flange portions, said lips disposed in abutment with the lower flanges of said vertical members.

6. Structure defined in claim 4, further including vertical plates disposed between said vertical members.

7. Structure defined in claim 6, wherein said vertical plates are of decreasing height from the inboard end to the outboard end of said top portion.

8. A springboard comprising: an elongated top portion; a plurality of vertical members secured to the underside of said top portion and extending longitudinally thereof, some of said vertical members extending only a portion of the length of said top portion from the inboard end thereof, other vertical members extending substantially the entire length of said top portion; bottom plate members secured to said vertical members, some of said bottom plate members extending only a portion of the length of said top portion, other bottom plate members extending substantially the entire length of said top portion.

9. Structure defined in claim 8 wherein said vertical members are each in the form of an inverted L and are disposed in back-to-back relation along at least a portion of the length of said top portion.

10. Structure defined in claim 8 wherein said bottom plate members include recessed portions extending therealong.

11. Structure defined in claim 8 further including complementary members disposed in back-to-back relation with said bottom plate members.

12. Structure defined in claim 10 further including complementary members disposed in back-to-back relation with said bottom plate members, said complementary members including longitudinally extending recessed portions.

References Cited in the file of this patent

UNITED STATES PATENTS

| | | |
|---|---|---|
| 2,649,304 | Ulanovsky | Aug. 18, 1953 |
| 2,678,213 | Buck | May 11, 1954 |
| 2,807,468 | Patterson | Sept. 24, 1957 |
| 2,831,688 | Knox | Apr. 22, 1958 |
| 2,864,616 | Rude | Dec. 16, 1958 |